United States Patent [19]
Davis

[11] Patent Number: 6,068,592
[45] Date of Patent: May 30, 2000

[54] HEAT ATTENUATING SPACER DEVICE FOR AN ENDOSCOPE

[76] Inventor: James M. Davis, 4687 Pond Apple Dr. S., Naples, Fla. 33999

[21] Appl. No.: 09/179,929

[22] Filed: Oct. 27, 1998

Related U.S. Application Data

[63] Continuation-in-part of application No. 09/053,428, Apr. 1, 1998, Pat. No. 5,971,919.

[51] Int. Cl.[7] ......................................................... A61B 1/07
[52] U.S. Cl. .......................... 600/132; 600/180; 600/181
[58] Field of Search ..................................... 600/123, 132, 600/178, 180, 181, 182; 362/32; 385/53

[56] References Cited

U.S. PATENT DOCUMENTS

| | | | |
|---|---|---|---|
| 4,153,356 | 5/1979 | Hama | 600/181 |
| 4,322,129 | 3/1982 | Takahashi | 600/181 |
| 4,325,618 | 4/1982 | Hosoda | 600/181 |
| 4,350,150 | 9/1982 | Kubota | 600/181 |
| 4,425,599 | 1/1984 | Rieder | 600/181 |
| 4,576,435 | 3/1986 | Nishioka | 600/178 |
| 4,807,026 | 2/1989 | Nishioka | 600/181 |
| 5,076,660 | 12/1991 | Messinger | 600/181 |
| 5,309,330 | 5/1994 | Pillers | 362/32 |
| 5,335,648 | 8/1994 | Kozawa | 600/181 |
| 5,642,456 | 6/1997 | Baker | 600/181 |
| 5,800,343 | 9/1998 | Takeuchi | 600/132 |
| 5,823,943 | 10/1998 | Tomioka | 600/181 |
| 5,847,759 | 12/1998 | Williams | 600/132 |

*Primary Examiner*—John P. Leubecker
*Attorney, Agent, or Firm*—William E. Noonan

[57] ABSTRACT

A heat attenuating spacer device interconnects an endoscope to a first end of a fiberoptic conductor. The opposite end of the conductor is operably engaged with a fiberoptic light source. The endoscope has an entry port for introducing light into the endoscope, which entry port is communicably engaged with the first end of the conductor. The spacer device includes a spacer body and an inlet formed in the spacer body. The inlet is communicably engaged with the first end of the conductor to receive light therefrom. An outlet is formed in the body and spaced apart from the inlet. The outlet is communicably engaged with the entry port of the endoscope. The body transmits light from the inlet to the outlet, which light is discharged from the outlet and introduced into the endoscope through the entry port. The spacer body and/or a filter contained by the body thermally insulates the light conductor from the endoscope.

17 Claims, 7 Drawing Sheets

HEAT ATTENUATING SPACER DEVICE FOR AN ENDOSCOPE

RELATED APPLICATIONS

This application is a continuation in part of U.S. patent application Ser. No. 09/053,428, filed Apr. 1, 1998, now U.S. Pat. No. 5,971,919.

FIELD OF THE INVENTION

This invention relates to a heat attenuating spacer device for interconnecting a fiberoptic conductor to an endoscope.

BACKGROUND OF THE INVENTION

Endoscopes are widely used to examine the gastrointestinal system and other internal regions of the human body. Conventionally, most endoscopes employ an elongated scope that is interconnected to a video camera. A fiberoptic light source delivers xenon and other types of light through the scope so that viewing is enhanced.

A serious problem is often exhibited when light is transmitted from a xenon light source to an endoscope. At the point where the fiberoptic cable interconnects the endoscope, the xenon light is funneled through an extremely narrow or constricted inlet. The cable generates very high temperatures, particularly at the distal end fitting that joins the endoscope. After the endoscope is used and removed, the hot cable fitting can accidentally ignite drapes, sheets and similar material present in the operating room. The high temperatures generated by the endoscope cable also present a potential risk of burns to medical personnel using the equipment.

SUMMARY OF INVENTION

It is therefore an object of the present invention to provide a spacer device for significantly reducing the heat generated at the junction of a fiberoptic cable and an endoscope.

If is a further object of this invention to provide a device that significantly reduces the danger of a fiberoptic cable causing fires and burns after the cable is disengaged from an endoscope.

It is a further object of this invention to provide a heat attenuating spacer device that enables the intensity of light transmitted to the endoscope to be adjusted quickly, conveniently and accurately by the medical personnel utilizing the equipment.

Is a further object of this invention to provide a heat attenuating spacer device that enables the light provided to an endoscope to be conveniently, effectively and accurately filtered so that desired wavelength bands of light are transmitted to an endoscope.

It is a further object of this invention to provide a heat attenuating spacer device that is particularly effective for reducing the heat generated at the junction of a fiberoptic cable and an endoscope when a xenon light source is involved.

This invention features a heat attenuating spacer device for interconnecting an endoscope to a first end fiberoptic conductor. The opposite end of the conductor is operably engagable with a fiberoptic light source. The endoscope has an entry port for introducing light into the endoscope, which entry port is communicably engagable with the first end of the conductor. The spacer device includes a spacer body and an inlet formed in the spacer body. The inlet is communicably engaged with the first end of the conductor to receive light therefrom. An outlet is formed in the body and spaced apart from the inlet. The outlet is communicably engagable with the entry port of the endoscope. Means are formed in the body for transmitting light from the inlet to the outlet, which light is discharged from the outlet and introduced into the endoscope through the entry port. The spacer body contains means for thermally insulating the light conductor from the endoscope.

In a preferred embodiment, the means for transmitting include a passageway formed through the body from the inlet to the outlet. Means may be mounted to the spacer body for controlling the intensity of light transmitted through the passageway to the endoscope. A means for controlling may include an intensity wheel rotatably mounted in the spacer body and having a plurality of differently sized apertures formed therein. The intensity wheel is rotated to position a selected aperture across the interior passageway. As a result, a corresponding intensity of light is transmitted from the conductor to the endoscope. The intensity wheel may include a peripheral edge that protrudes through a slot in the body. The peripheral edge is engaged to rotate the wheel within the body. The apertures may include a graduated series of discrete openings arranged angularly about the wheel. Alternatively, the apertures may comprise a single, generally crescent-shaped or spiral opening having a continuously expanding width.

Alternative wheels may be mounted in the spacer body to provide infrared filtration, on/off switching, and/or color selection. The wheel may include one or more openings formed angularly therein. In one embodiment, the opening includes an infrared filter. The wheel may also include a solid portion angularly adjacent the opening. In such cases, the wheel is rotated to selectively position one of the openings in the solid portion in the passageway to respectively transmit and block light there through. The color of light transmitted through the passageway may be controlled by means such as a filter wheel mounted rotatably within the spacer body. The filter wheel carries a plurality of angularly spaced light filters. Each filter defines a selective wavelength band. The filter wheel is rotated to position a selected filter across the passageway of the spacer body such that a corresponding wavelength band of light is transmitted through the passageway. Typically, one of these filters comprises includes an infrared filter. In alternative embodiments, the infrared filter is fixed to the spacer body and extends permanently across the passageway.

The spacer body may be configured and/or composed such that it acts as a heat sink for the light emitted by the fiberoptic conductor. As a result, heat at the connection between the conductor and the endoscope is reduced significantly. Thermal insulation may also be provided by the infrared filter mounted in the spacer body, as well as the ability to control light intensity through use of an intensity wheel.

BRIEF DESCRIPTION OF THE DRAWINGS

Other objects, features and advantages will occur from the following description of preferred embodiments and the accompanying drawings, in which.

DETAILED DESCRIPTION OF THE PREFERRED EMBODIMENT

Figure 1:
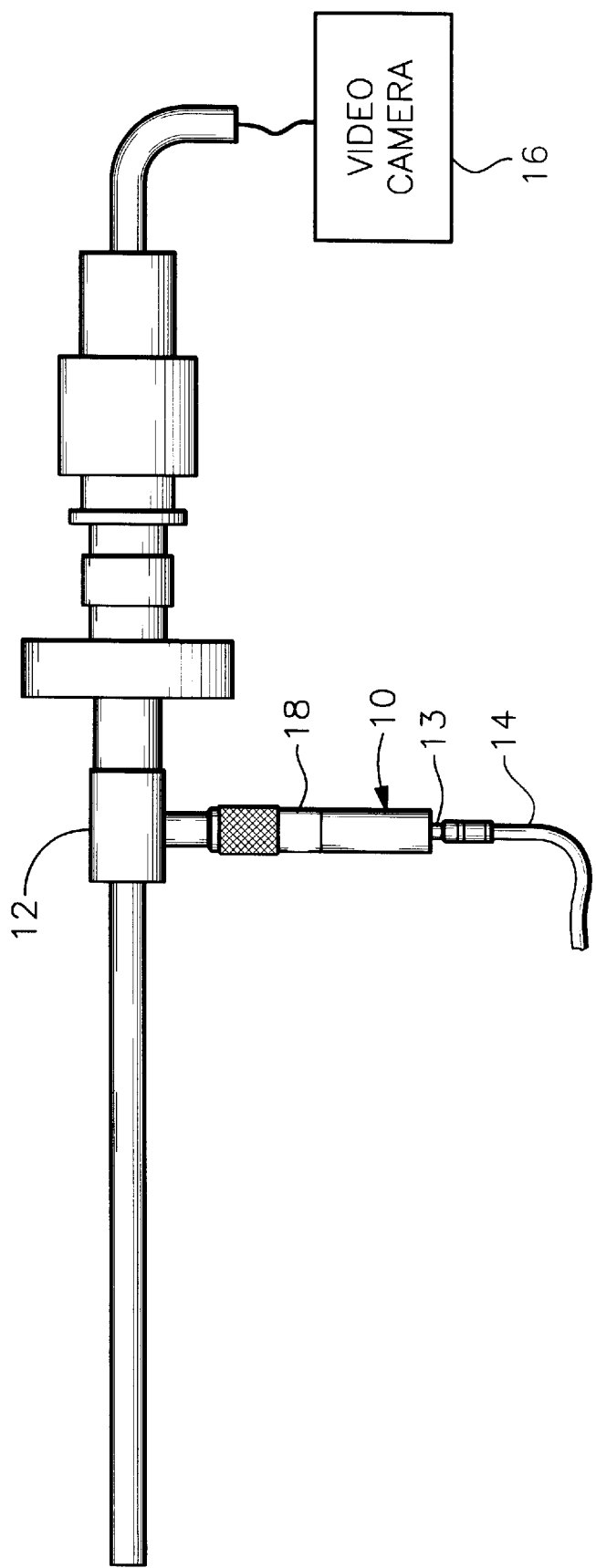
FIG. 1 is an elevational, side view (partly in schematic) of a preferred heat attenuating spacer device interconnecting a fiberoptic cable and an endoscope.

There is shown in FIG. 1 a heat attenuating spacer device 10 that interconnects a conventional medical endoscope 12 to a first, light emitting end 13 of a standard fiberoptic conductor 14. The endoscope is a known item of the type used in various medical and surgical applications. For example, endoscope 12 may be used to investigate and diagnosis problems within the gastrointestinal system. Endoscopes are also often employed by introducing them through a trocar so that a patient's tissue or internal organs may be examined. The apparatus of this invention may be adapted to virtually all known types of medical endoscopes.

A video camera 16 is operably interconnected to endoscope 12 in a known manner. The scope includes an optical light inlet 18. In the prior art, the inlet of the endoscope releasably, communicably and directly receives one end (the output end 13) of a standard fiberoptic illuminating cable, such as cable 14. The cable assembly may comprise an elongate universal type fiberoptic cable having construction that will be well known to those skilled in the art. Various alternative types of cables and other fiberoptic conductors may be utilized in accordance with this invention. Light is transmitted through the cable from a fiberoptic illuminator, not shown in FIG. 1. The light is delivered to endoscope 12 through entry port 18 so that the endoscope is operated in a known fashion. Unfortunately, because the cable 14 narrows drastically at the point of connection to entry port 18, a tremendous amount of heat is generated at the end plug of the cable. As previously described in the Background of the Invention, this causes the risk of fires and burns when the cable is detached from the previously used endoscope.

Spacer device 10 is releasably interconnected between the cable 14 and entry port 18 of scope 12 so that the above-described problem is reduced. Device 10 is shown in greater detail in FIG. 2. Therein, the spacer device is communicably connected to end 13 of cable 14 and disengaged from entry port 18. Cable 14 may comprise various known fiberoptic conductors. Opposite end 21 of the cable is operably attached to a conventional fiberoptic illuminator 20. The illuminator does not comprise a part of this invention and is not described in detail herein. A typical illuminator includes assorted dials and gauges, as well as a standard light output port, not shown, that is operably engaged by a plug or fitting located at end 21 of cable 14. A second plug or fitting 22 is located at the distal end 13 of the cable. The illuminator produces a desired type of light (e.g. xenon, halogen, neon, etc.) which light is introduced into cable 14 and transmitted through the cable to device 10 in a manner that will be described more fully below. The spacer device then transmits the light to entry port 18 of endoscope 12, and at the same time dissipates the heat generated by the emitted light.

Figure 2:
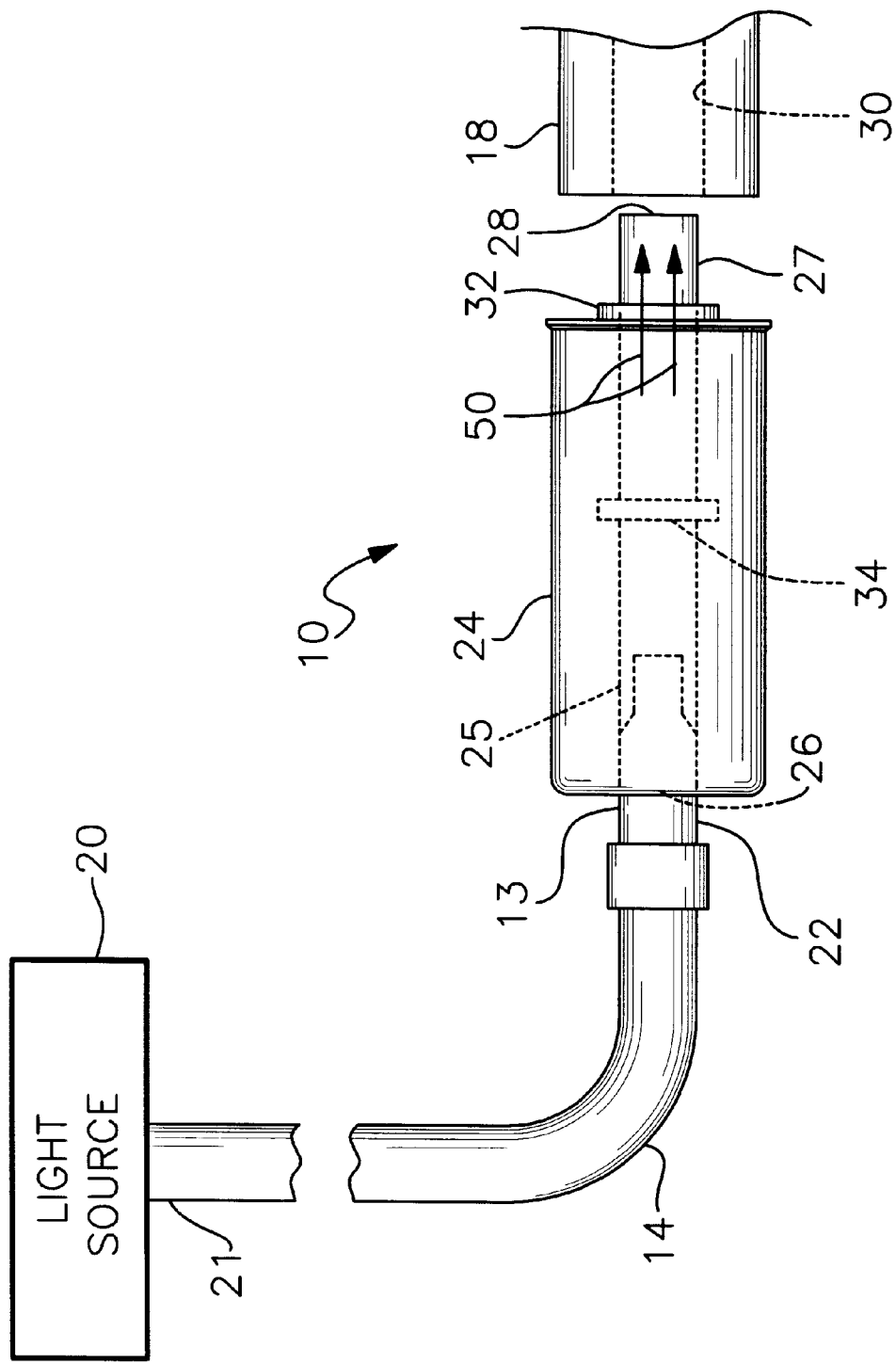
FIG. 2 is an elevational, partly schematic view of the spacer device of FIG. 1 prior to connection of the device with the endoscope.
Figure 3:
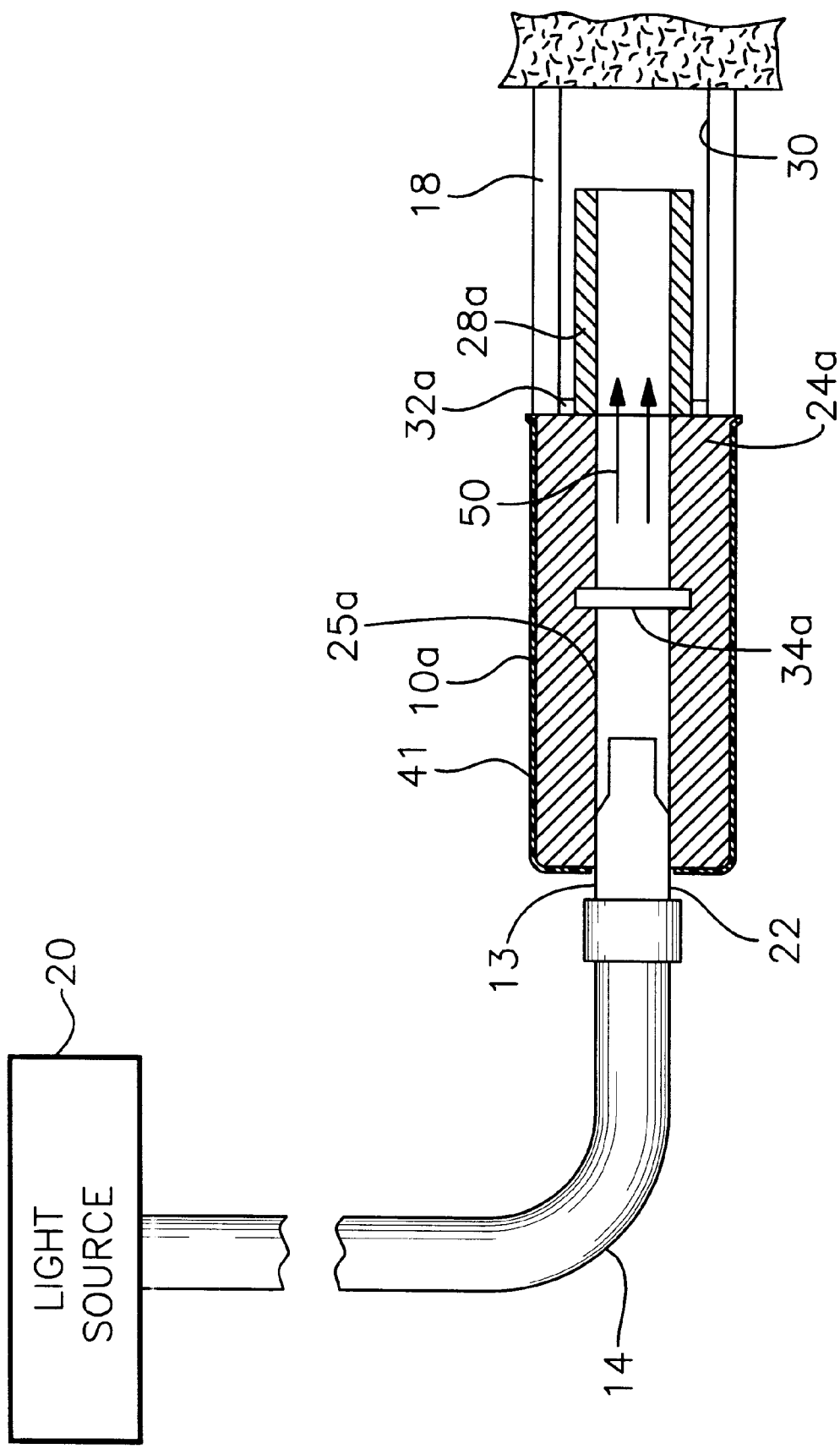
FIG. 3 is an elevational, partly schematic view of the spacer device interconnected between the fiberoptic cable and the entry port of the endoscope; the spacer device further includes an opaque casing.

Spacer device 10 features a unitary plastic spacer body 24. The version shown in FIGS. 1–3 comprises a disposable, one-piece body that may be manufactured by suitable molding or other known processes. Body 24 typically includes a plastic material that dissipates heat effectively. Carbon based materials such as polycarbonate and carbon acrylic are preferred, although alternative materials may be used within the scope of this invention. The version depicted in FIGS. 1–3 is manufactured relatively simply and inexpensively. As a result, device 10 may be disposable and replaced between each use of the endoscope.

A central channel or passageway 25 extends fully through spacer body 24. A light inlet 26 comprising a socket or other receptacle is formed in body 24 at one end of passageway 25. This inlet receives plug 22 of cable 14. The opposite end of spacer body 24 carries a tubular plug 27 that communicates with passageway 25. The distal end of plug 27 defines a light outlet 28. Plug 27 is releasably engaged with a receptacle 30 of the endoscope's entry port 18. An O-ring or gasket 32 is disposed about plug 27. This component permits the plug to fit snugly with the entry port when spacer device 10 is engaged with the endoscope.

An infrared (IR) filter 34 is fixed within spacer body 24 such that the filter extends across central passageway 25. This filter is permanently installed across the passageway when the spacer body is formed. Alternatively, the IR filter may be permanently mounted within passageway using adhesives or other known fastening means.

In operation, plug 22 is inserted into inlet 26 of spacer body 24. Outlet 28 is inserted into receptacle 30 of entry port 18. Light source 20 is activated and cable 14 transmits light from the light source to the spacer device. Light is emitted from end plug 22 into central passageway 25. The passageway transmits the light from the fiberoptic cable through the spacer device and to the outlet 28. As the light passes through the spacer device, the spacer device acts as a heat sink to dissipate the heat generated by the light as it is funneled through the plug 22. At the same time, infrared filter 34 helps to filter still more heat from the transmitted light. Finally, the heat attenuated light is emitted from tubular outlet 28 and into entry port 18 of the endoscope. This light is used for endoscopic procedures in a known manner.

A slightly different disposable spacer device 10a is illustrated in FIG. 3. Once again, the spacer device is releasably engaged with a light emitting end plug 22 of a conventional fiberoptic cable 14. The cable is operably attached, as previously described, to a fiberoptic light source 20. This embodiment includes a generally cylindrical heat dissipating plastic body 24a. A central passageway 25a is formed through the spacer body. Tubular outlet 28a communicates with passageway 25a and is inserted removably into entry port 18 of the endoscope. O-ring 32a helps to hold tubular outlet 28a snugly within receptacle 30 of entry port 18. IR filter 34a is again permanently mounted across passageway 25a.

In operation, light from source 20 is projected through plug 22 into passageway 25a of spacer body 24a. The insulating material and configuration of the spacer body, as well as the presence of IR filter 34a helps to dissipate the heat generated at plug 22 of cable 14. As a result, when the cable and plug are disengaged from the spacer device, high temperatures are not exhibited by the plug. Potential fires and burns are thereby avoided.

The version of FIG. 3 also features an opaque casing 41 that covers most if not all of the surface of the spacer body. Casing 41 is particularly effective when a clear polycarbonate or acrylic is used for the spacer body. Opaque casing 41 prevents light from disbursing radially or transversely through body 24. Instead, the light is channeled exclusively in the direction of arrows 50 through the discharge or outlet end of the spacer body. This prevents potentially distracting ambient light from being disbursed from the spacer body and provides the examining physician with improved viewing.

Figure 4:
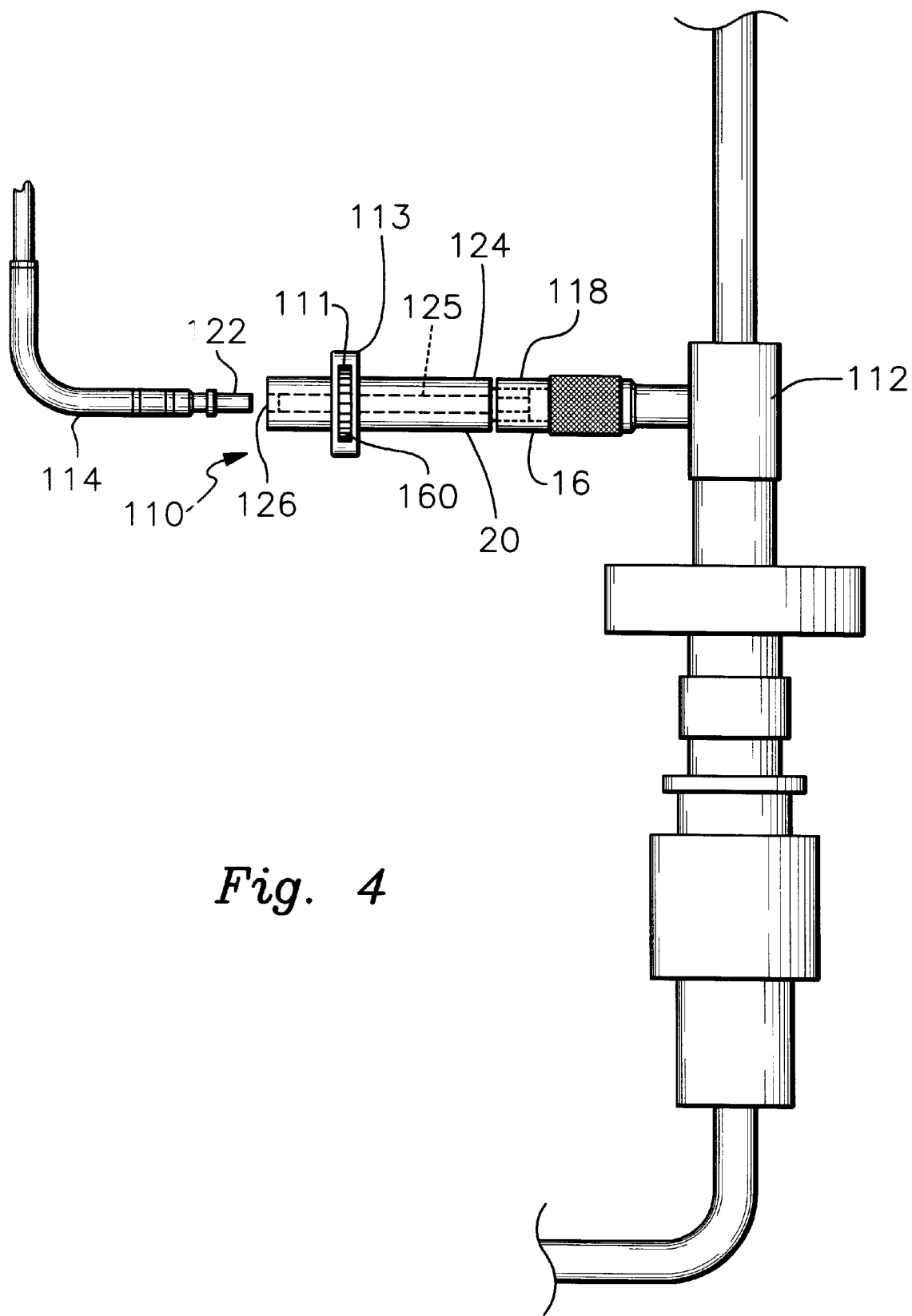
FIG. 4 is an elevational, side view of an alternative spacer component according to this invention attached to an endoscope and ready to receive the distal end of a fiberoptic cable; this version of the spacer device includes a rotatable wheel that adjusts the light transmitted through the spacer device.

FIG. 4 discloses an alternative, non-disposable heat attenuating spacer device 110 that includes a light adjustment mechanism 111. Once again, the spacer device is releasably interengagable between a fiberoptic cable 114 and an entry port 118 of an endoscope 112. In FIG. 4, device 110 is already attached to the endoscope; light emitting end plug 122 of cable 114 is positioned adjacent to and disengaged from device 110.

The heat attenuating spacer device 110 includes an elongate, generally cylindrical spacer body 124. A passageway 125 extends centrally through the spacer body. As in the previously described embodiment, inlet 126 is formed at the first end of the passageway. A tubular outlet, not shown in FIG. 4 but analogous to outlets 28 and 28a in the previously described embodiments, is formed at the opposite end of the spacer body. The outlet is releasably engaged with entry port 118 in the manner previously described. The spacer body is manufactured using a technique and materials similar to those specified in the previous embodiment. Again, the materials should preferably comprise an effective heat dissipating material that enables the spacer body to function as a heat sink.

In this version, the spacer device also includes an annular flange 113 that is formed at some point along the length of the spacer body. The particular location may be varied within the scope of this invention. Light adjustment mechanism 111 is mounted within the spacer body and, more particularly, within flange 113. Mechanism 111 may comprise one of a variety of devices, which are described hereinafter. More particularly, the adjuster features a wheel 160 mounted within body 124 such that the peripheral edge of the wheel protrudes from a slot in flange 113.

Figure 5:
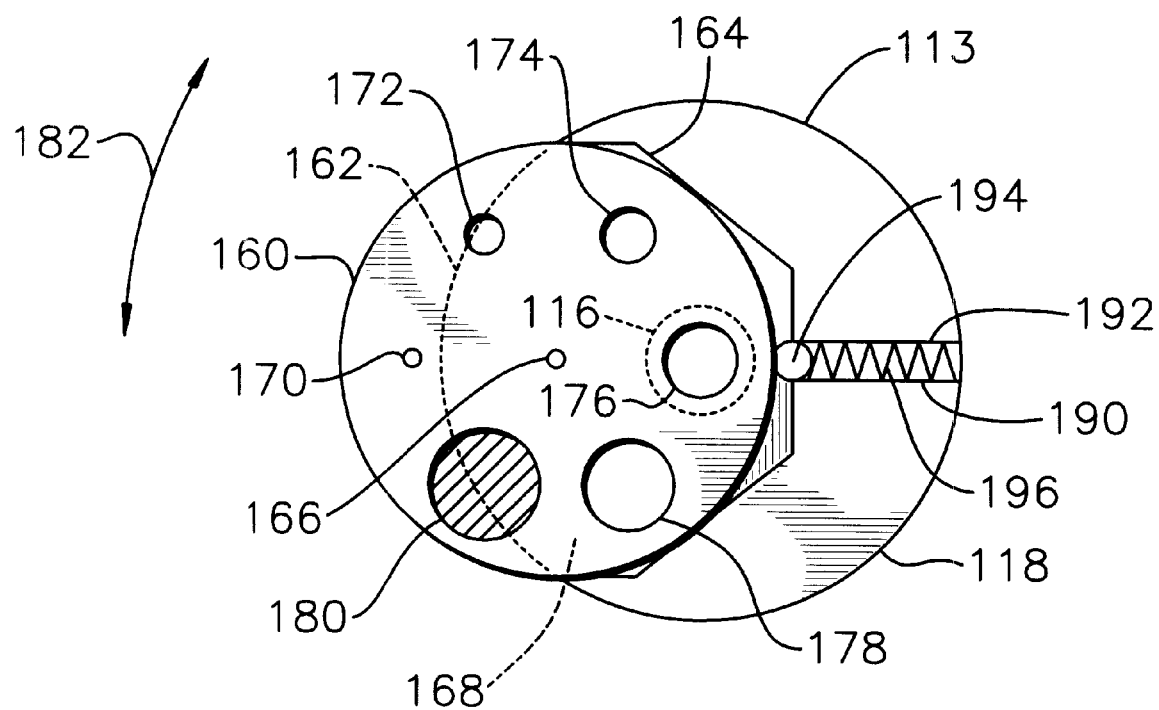
FIG. 5 is an elevational, cross sectional view of an intensity adjustment wheel mounted in the spacer device and including a series of graduated openings.

In the embodiment illustrated in FIG. 5, wheel 160 comprises an intensity adjustment wheel. The wheel is offset relative to flange 113 and is received within a recess 164 formed in the flange. Wheel 160 is rotatably mounted by an axial pin 166 to a rearward wall 168 of flange portion 113. An analogous wall covers the forward surface of 160 (i.e. the surface facing outwardly from the page in FIG. 4).

Intensity adjustment wheel 160 includes a graduated series of progressively larger diameter circular openings 170, 172, 174, 176, 178 and 180 that are formed at regularly spaced intervals about the wheel. By rotating the wheel as indicated by double headed arrow 182, openings 170–180 may be selectively positioned across passageway 116. As a result, a predetermined intensity of light (determined by the diameter of the selected opening) is transmitted through the passageway. If only a minimal amount of light is desired, the wheel is rotated so that smaller diameter opening 170 is positioned across passageway 116. Conversely, if a maximum amount of light is desired, large opening 180 is positioned across the passageway. Additionally, an optional infrared filter is fitted on opening 180. The remaining openings may be fully exposed or include transparent lenses. In alternative embodiments, other varieties of filters may be placed in one or more of the openings.

Each opening in wheel 160 is held in place across passageway 116 by a releasable locking mechanism 190. In particular, flange portion 118 includes a radial slot 192 that houses a bearing 194. The bearing is urged inwardly toward the center of flange portion 118 and into recess 164 by a spring mechanism 190. A plurality of indents or recesses, not shown, are formed about the periphery of wheel 160. Each such indent is positioned on the periphery of wheel 160 adjacent to a respective one of the openings 170–180. When a particular opening, e.g. opening 176, is positioned across passageway 116, spring mechanism 190 urges bearing 194 to engage the corresponding adjacent indent formed in the periphery of wheel 160. This constrains the wheel so that the opening is held in position across passageway 116. Unintended movement of the selected filter is prevented. To adjust the intensity, the operator simply places his or her thumb against the peripheral portion of the wheel that protrudes from housing 114. The wheel is then rotated as indicated by double-headed arrow 182. Bearing 194 disengages the notch in which is has previously resided and compresses spring mechanism 190. As a result, the wheel is released and free to rotate. The operator turns the wheel until a new selected opening is placed in position across the passageway. The spring and bearing mechanism re-engage with the notch corresponding to the opening. As a result, the wheel is again held in place until subsequent adjustment is desired.

Figure 6:
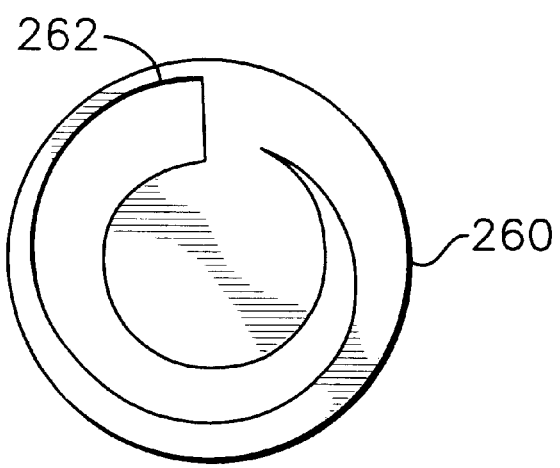
FIG. 6 is a front elevational view of an alternative intensity adjustment wheel, which employs a variable width opening.

An alternative intensity adjustment wheel 260 is depicted in FIG. 6. That wheel is mounted in a housing in a manner analogous to wheel 160 shown in FIG. 5. Wheel 260 is provided with a single, generally spiral or crescent-shaped opening 262. Opening 262 features a continuously expanding width. By rotating wheel 260 in the manner previously described for wheel 160, a selected portion of opening 262 is positioned across the passageway formed through the intensity adjustment mechanism. As a result, a desired intensity of light is transmitted from the fiberoptic cable through the spacer component.

Figure 7:
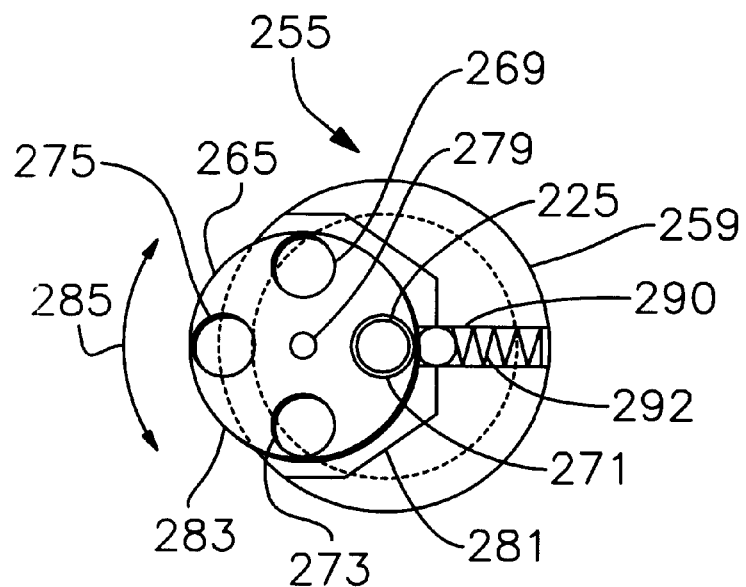
FIG. 7 is an elevational, cross sectional view of a spacer component that employs a filter wheel for adjusting the color of light transmitted through the spacer device.

Alternatively, a color adjustment mechanism 255, FIG. 7, may be formed in the spacer device in a manner analogous to the above described intensity adjustment mechanism. A large diameter flange 259, shown in FIG. 7, is attached to the remainder of the spacer body as described above. A circular filter wheel 265 (analogous to wheel 160) is rotatably mounted in flange portion 259. Filter wheel 265 includes frame 267 and four individual light filters 269, 271, 273 and 275 that are mounted within frame 267. A central opening 277 is engaged by a pin 279 that rotatably mounts wheel 265 within flange 259. The filter wheel is received in an octagonal recess 281 formed within flange 259. Wheel 265 is axially offset within the spacer body such that a selector one of the filters 269, 271, 273 and 275 may be positioned centrally in the spacer body across the passageway. This is accomplished by rotating wheel 265 above pin 279 to position the selected filter across the passageway. A peripheral portion 283 of wheel 265 protrudes from flange 259. As a result, the operator can place his or her thumb against peripheral edge 283 and rotate the filter wheel in the directions indicated by double-headed arrow 285. In this manner, selected filter 269–275 may be operably positioned across the passageway so that only light of the corresponding color or wavelength band is transmitted through the spacer device into the endoscope. The filter is held in place in the selected position by a locking mechanism 290. This mechanism includes a spring loaded ball plunger 292 that is mounted within flange portion 259. A plurality of tiny recesses are formed about the circumference of wheel 265. Each recess is positioned proximate one of the filters 269, 271, 273 and 275. As a selected filter is rotated into position across the passageway 225, the ball of plunger 292 engages the recess to hold the filter wheel in that selected position. To manipulate the filter wheel into an alternative position the operator simply presses his or her thumb against edge 283 of wheel 265 and rotates the wheel as indicated by double headed arrow 285. This urges the recess to disengage the ball of plunger 292. The plunger allows wheel 265 to rotate until the next selected filter is properly positioned in front of passageway 225. The recess associated with this filter then engages the ball plunger to provisionally lock the filter wheel and the selected filter in place.

By employing the above-described apparatus, color or wavelength bands transmitted through and emitted from spacer device 210 may be adjusted. Any desired number of filters may be employed in wheel 265.

Figure 8:
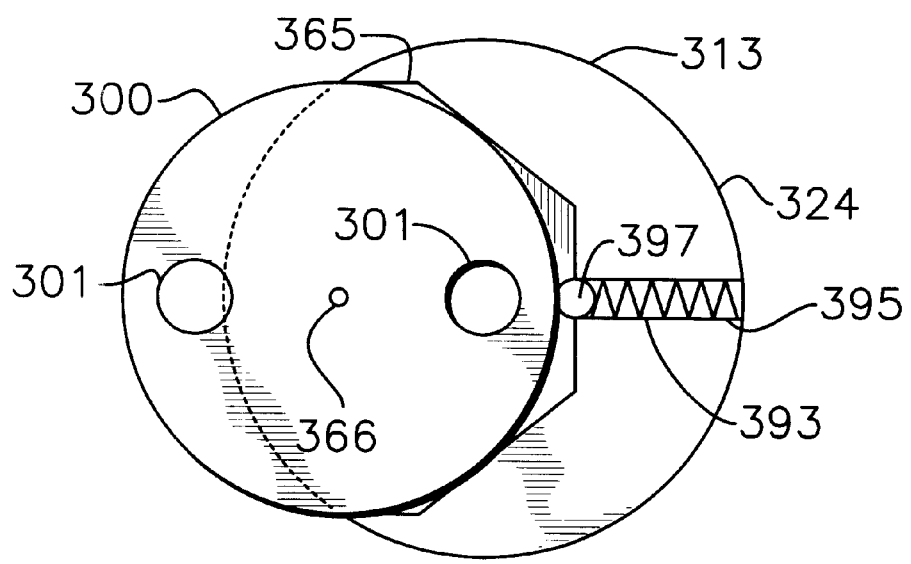
FIG. 8 is an elevational, cross sectional view of a spacer device that employs a wheel having two diametrically opposed openings; by rotating the wheel light may be selectively transmitted or blocked from passing through the passageway of the spacer device.

Light through the transilluminator may be selectively switched on and off by a light transmitting wheel 300, shown in FIG. 8. This wheel employs a structure that is analogous to the previously described intensity adjustment wheel (e.g. wheel 160). Specifically, light-transmitting wheel 300 is mounted rotatably within flange 313 of body 324 by axial pin 366. This pin may be the same pin that axially mounts the intensity adjustment wheel. Wheel 300 is disposed in a recess 365 of body 324. A spring 393 located in slot 395 urges a bearing 397 into engagement with the peripheral edge of wheel 300. The wheel includes a plurality of circular openings 301 that are spaced radially about wheel 300. In the embodiment disclosed in FIG. 8, a pair of openings 301 are positioned 180 degrees apart on the wheel. The remainder of the wheel is solid.

To transmit light through the previously described passageway in body 324, wheel 300 is rotated to position a selected one of the openings 301 in front of the passageway. One of the openings (the right hand opening) is shown in such a position in FIG. 8. Light passing through the passageway is subsequently switched off by simply rotating wheel 300 in either direction until a solid portion of the wheel is disposed in front of the passageway. This blocks light from passing through the passageway and the spacer device. The peripheral edge of wheel 300 typically includes four position-defining indents that are interengagable with bearing 397. Two of the indents are formed adjacent respective openings 301. The other indents are formed at radial positions that are between the openings 301 and approximately 180 degrees apart. The wheel is rotated such that spring 393 urges bearing 397 into a respective one of the indents. This holds the wheel in place at a selected position. When one of the openings 301 is disposed in front of the passageway, light is transmitted through the spacer device. Alternatively, when a solid portion of the wheel is disposed in front of the passageway, no light is transmitted. Accordingly, the transilluminator may be switched on or off by simply rotating the wheel 300 approximately 90 degrees until a succeeding indent interengages bearing 397. This selectively and alternately positions either an opening or a solid portion of wheel 300 in front of the passageway so that light is transmitted or blocked and the apparatus is switched on or off, respectively.

The above described on/off switch, as well as the light and color adjustments facilitate the use of this device considerably. The physician or other medical personnel who is manipulating the endoscope is able to turn the transmitted light on or off quickly, conveniently, and reliably. Instructions do not have to be given to an assistant. Time is saved and miscommunications are eliminated. Either of the operations are accomplished with a simple and quick movement of the user's thumb in a manner similar to that described for the intensity adjustment wheel.

In alternative embodiments of this invention, the intensity adjusting mechanisms disclosed herein might be replaced by other types of light controlling devices that are communicably interconnected between the fiberoptic cable and the spacer component. For example, an adjustable iris as disclosed in co-pending U.S. patent application Ser. No. 08/719,838 may be utilized. It should also be understood that various types of fiberoptic cables, including those employing a liquid light transmitting medium might be utilized with this transilluminator.

Accordingly, the present invention permits sections of tissue to be effectively transilluminated and investigated so that the precise location of blood vessels may be quickly and conveniently determined. The spacer device of this invention is lightweight and easy to operate. It virtually eliminates any chance that the patient or the patient's tissue will be burned during the transillumination process. As a result, this invention provides significant benefits when used for surgical and other medical procedures.

Figure 9:
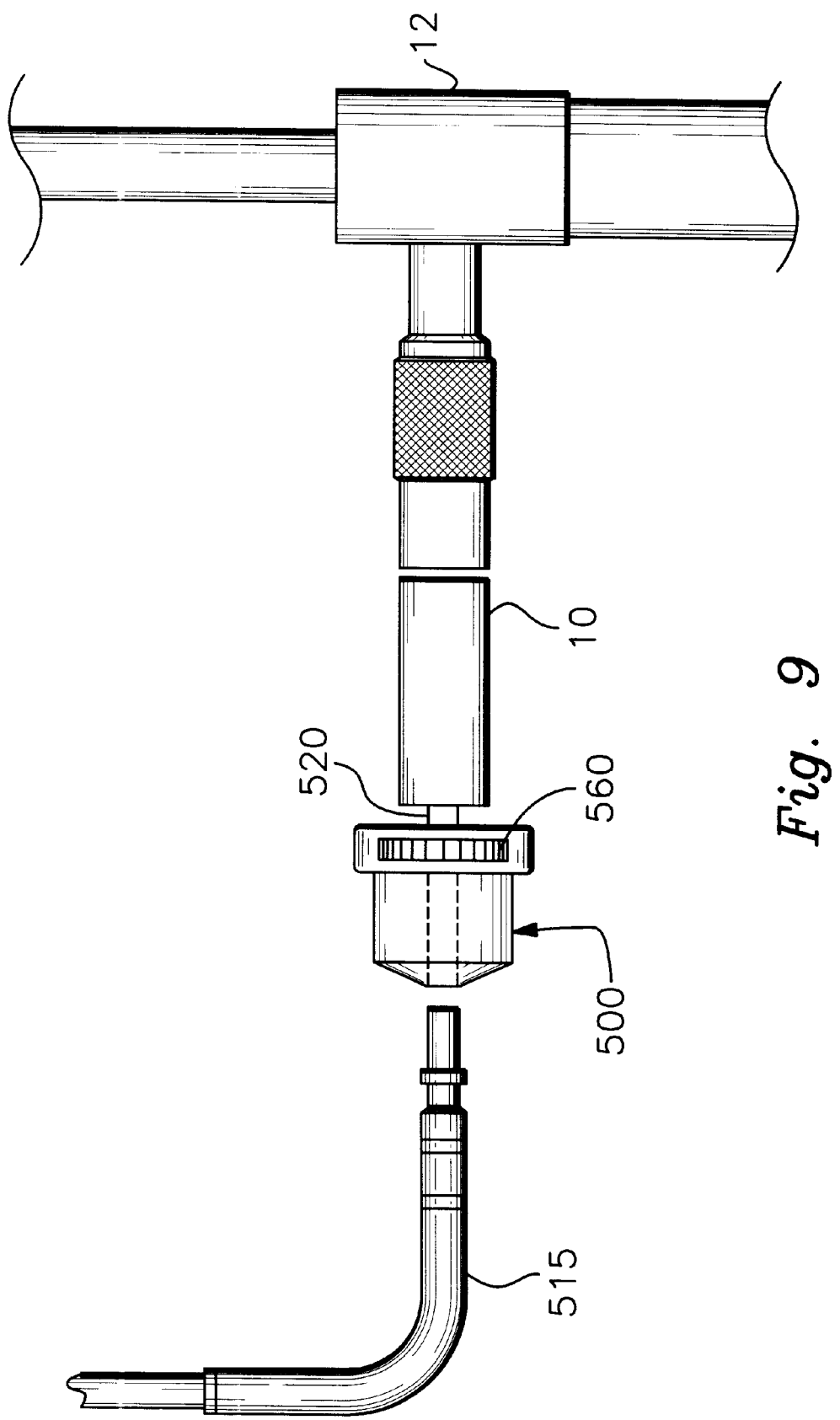
FIG. 9 is an elevational, side view of a disposable spacer device according to the invention used in combination with an intensity control mechanism; both components are interconnected between a fiberoptic cable and an endoscope.

As shown in FIG. 9, in certain embodiments, disposable spacer device 10, constructed as previously described, may be used in combination with an intensity control mechanism 500 of the type disclosed, for example, in U.S. patent application Ser. No. 09/054,796 filed Apr. 3, 1998. Specifically, mechanism 500 is releasably and communicably engaged with the distal end of fiberoptic cable 515. An outlet 520 of mechanism 500 is communicably interengaged with the previously described inlet of spacer device 10. The outlet of the spacer device is interengaged in a manner previously described the entry port of endoscope 12. Mechanism 500 includes an intensity control wheel 560 that is rotated in the manner described in the above-referenced applications to control the intensity of light transmitted from the fiberoptic cable to the spacer device. In a similar manner, a color adjustment mechanism of the type disclosed in U.S. Patent Application Serial No. 09/010,413 and an on/off switch of the type disclosed in U.S. patent application Ser. No. 09/054,796 may be interconnected with spacer device 10 so that the light transmitted through the spacer device is adjustable. The descriptions and illustrations contained in the referenced applications are likewise included herein by reference. Accordingly, color and intensity, as well as infrared filtration and on/off control may be achieved by either incorporating the control mechanism integrally into the spacer device as shown in FIGS. 4–8 or by combining the spacer device with a separate light adjusting mechanism in the manner, for example, in FIG. 9. A wide variety of light characteristics may thus be delivered to the endoscope so that effective viewing is achieved. In all of the embodiments, the spacer device acts as a heat sink and/or infrared filter so that heat is effectively attenuated. As a result, when the fiberoptic cable is disconnected from the endoscope, accidental paper and fabric fires as well as human burns are avoided.

It should be noted that the embodiments herein utilize plug type interconnections between the cable, spacer device and entry port of the endoscope. In alternative embodiments, other forms of interconnection, such as complementary threads commonly exhibited by universal type fiberoptic cables, may be employed.

It will thus be seen that the objects made apparent from the preceding description are sufficiently obtained and certain changes may be made in the above construction without departing from the scope of the invention. It is intended that all matter contained in the above description and shown in the accompanying drawings be interpreted as illustrative and not in an imitative sense. Although specific features of the invention are shown in some drawings and not others, this is for convenience only as each feature may be combined with any or all of the features in accordance with the invention. Other embodiments, within the scope of this invention, will occur to those skilled in the art.

What is claimed is:

1. A heat attenuated endoscopic device comprising:
    an endoscope having an entry port for introducing light into said endoscope;
    a fiberoptic conductor that is operably engagable with a fiberoptic light source; and
    a spacer device that communicably interconnects said conductor and said endoscope, said spacer device including a spacer body having an inlet formed therein, said inlet being communicably engaged with said conductor to receive light transmitted from the fiberoptic light source, an outlet formed in said body and spaced apart from said inlet, said outlet being communicably engagable with said entry port of said endoscope, and means formed in said body for transmitting light from said inlet to said outlet, which light is discharged from said outlet and introduced into the endoscope through said entry port;
    said body containing means for thermally insulating said fiberoptic conductor from said endoscope.

2. The device of claim 1 in which said spacer body comprises a heat sink.

3. A heat attenuating spacer device for communicably interconnecting an endoscope and a first end of a fiberoptic conductor, the opposite second end of the conductor being operably engagable with a fiberoptic light source, the endoscope having an entry port for introducing light into said endoscope, which entry port is communicably engagable with the first end of the conductor, said spacer device comprising:
    a spacer body;
    an inlet formed in said body, said inlet being communicably engaged with the first end of the conductor to receive light therefrom;
    an outlet formed in said body and spaced apart from said inlet, said outlet being communicably engagable with the entry port of the endoscope;
    means formed in said body for transmitting light from said inlet to said outlet, which light is discharged from said outlet and introduced into the endoscope through the entry port, said means for transmitting including a passageway formed through said body from said inlet to said outlet; and
    means mounted to said spacer body for controlling the intensity of light transmitted through said passageway to the endoscope;
    said spacer body containing means for thermally insulating said inlet from said outlet.

4. The device of claim 3 in which said means for controlling includes an intensity wheel rotatably mounted in said spacer body and having a plurality of differently sized apertures formed therein, said wheel being rotated to position a selected aperture across said interior passageway, whereby a corresponding intensity of light is transmitted from the conductor to the endoscope.

5. The device of claim 4 in which said wheel includes a peripheral edge that protrudes through a slot in said body, said peripheral edge being engaged to rotate said wheel within said body.

6. The device of claim 4 in which said apertures comprise a graduated series of discrete openings arranged angularly about said wheel.

7. The device of claim 4 in which said apertures comprise a single, generally crescent-shaped opening having a continuously expanding width.

8. The device of claim 3 in which said spacer body comprises a heat sink.

9. A heat attenuating spacer device for communicably interconnecting an endoscope and a first end of a fiberoptic conductor, the opposite second end of the conductor being operably engagable with a fiberoptic light source, the endoscope having an entry port for introducing light into said endoscope, which entry port is communicably engagable with the first end of the conductor, said spacer device comprising:
    a spacer body;
    an inlet formed in said body, said inlet being communicably engaged with the first end of the conductor to receive light therefrom;
    an outlet formed in said body and spaced apart from said inlet, said outlet being communicably engagable with the entry port of the endoscope;
    means formed in said body for transmitting light from said inlet to said outlet, which light is discharged from said outlet and introduced into the endoscope through the entry port, said means for transmitting including a passageway formed through said body from said inlet to said outlet; and
    a wheel rotatably mounted in said spacer body and having a light transmitting opening formed therein, said wheel being rotated to selectively position said opening across said passageway, which light is transmitted through said passageway from said inlet to said outlet;
    said spacer body containing means for thermally insulating said inlet from said outlet.

10. The device of claim 9 in which said opening includes an infrared filter.

11. The device of claim 9 in which said wheel includes a solid portion angularly adjacent said opening, said wheel being rotated to selectively position one of said opening and said solid position in said passageway to respectively transmit and block light therethrough.

12. A heat attenuating spacer device for communicably interconnecting an endoscope and a first end of a fiberoptic conductor, the opposite second end of the conductor being operably engagable with a fiberoptic light source, the endoscope having an entry port for introducing light into said endoscope, which entry port is communicably engagable with the first end of the conductor, said spacer device comprising:
    a spacer body;
    an inlet formed in said body, said inlet being communicably engaged with the first end of the conductor to receive light therefrom;

an outlet formed in said body and spaced apart from said inlet, said outlet being communicably engagable with the entry port of the endoscope;

means formed in said body for transmitting light from said inlet to said outlet, which light is discharged from said outlet and introduced into the endoscope through the entry port, said means for transmitting including a passageway formed through said body from said inlet to said outlet; and means mounted to the spacer body for controlling the color of light transmitted through the passageway;

said spacer body containing means for thermally insulating said inlet from said outlet.

13. The device of claim 12 in which said means for controlling the color includes a filter wheel mounted rotatably within said spacer body and carrying a plurality of angularly spaced light filters, each said filter defining a selected wavelength band said filter wheel being rotated to position a selected filter across said passageway of said body such that a corresponding wavelength band of light is transmitted through said passageway.

14. The device of claim 13 in which one of said filters comprises an infrared filter.

15. A heat attenuating spacer device for communicably interconnecting an endoscope and a first end of a fiberoptic conductor, the opposite second end of the conductor being operably engagable with a fiberoptic light source, the endoscope having an entry port for introducing light into said endoscope, which entry port is communicably engagable with the first end of the conductor, said spacer device comprising:

a spacer body;

an inlet formed in said body, said inlet being communicably engaged with the first end of the conductor to receive light therefrom;

an outlet formed in said body and spaced apart from said inlet, said outlet being communicably engagable with the entry port of the endoscope; and means formed in said body for transmitting light from said inlet to said outlet, which light is discharged from said outlet and introduced into the endoscope through the entry port, said means for transmitting including a passageway formed through said body from said inlet to said outlet;

said spacer body containing means for thermally insulating said inlet from said outlet, said means for thermally insulating including an infrared filter that is extendable across said passageway to reduce the light transmitted therethrough.

16. The device of claim 15 in which said filter is fixed to said body and extends permanently across said passageway.

17. The device of claim 15 in which said filter is carried by a wheel rotatably mounted for said body said wheel being rotated to selectively position said filter across said passageway.

* * * * *